March 10, 1970    C. E. GEIB, JR    3,500,088
MOTOR SYSTEM WITH EDDY-CURRENT COUPLING
Original Filed Oct. 8, 1962    2 Sheets-Sheet 1
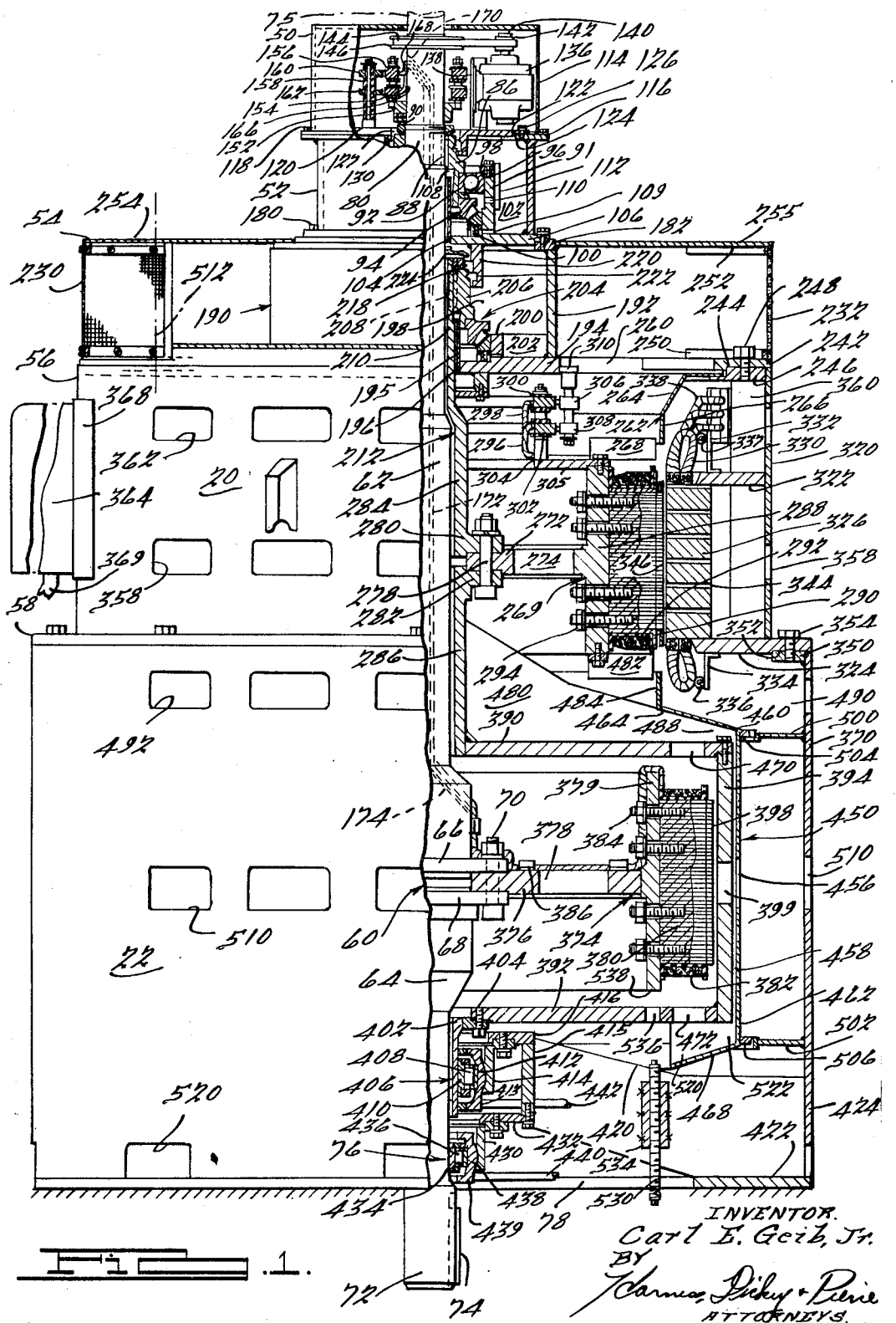
INVENTOR.
Carl E. Geib, Jr.
BY
Carmen, Dickey + Pierce
ATTORNEYS.

March 10, 1970 C. E. GEIB, JR 3,500,088
MOTOR SYSTEM WITH EDDY-CURRENT COUPLING
Original Filed Oct. 8, 1962 2 Sheets-Sheet 2
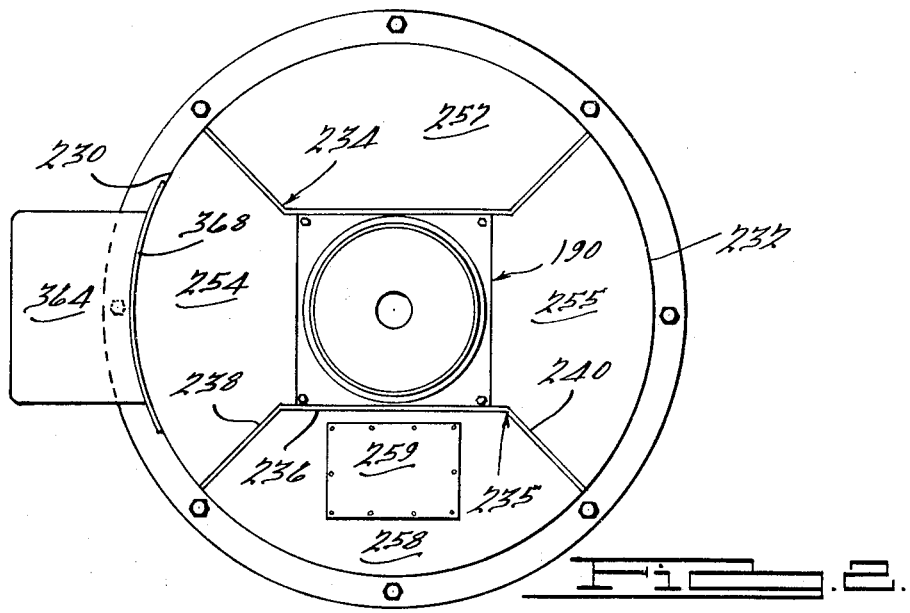
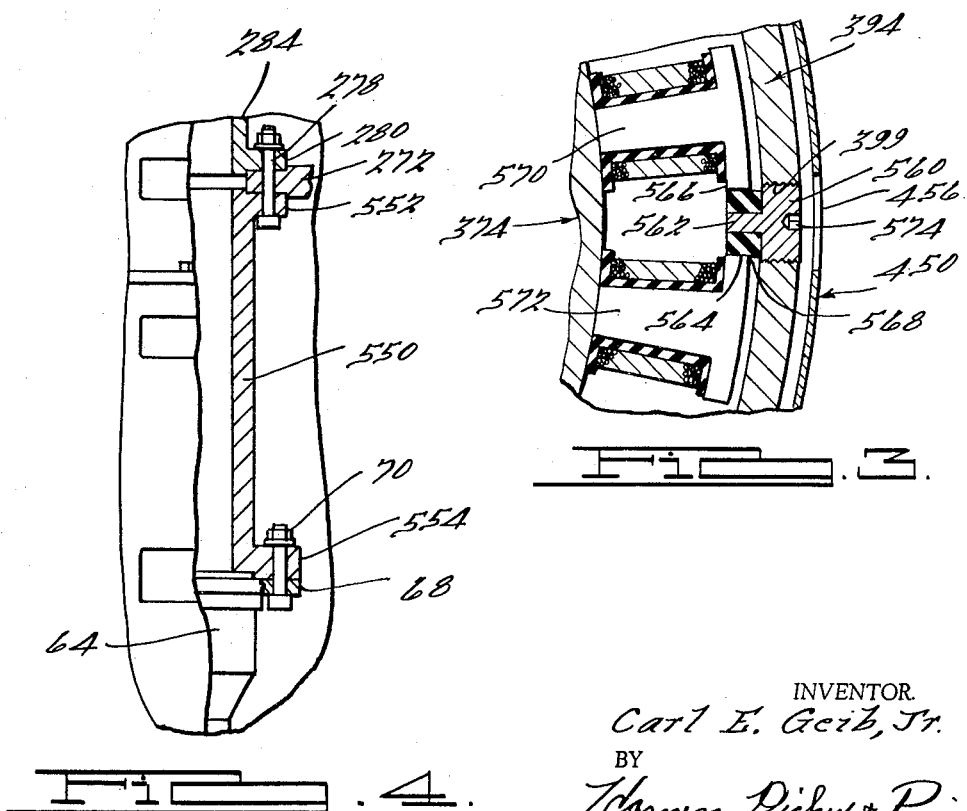
INVENTOR.
Carl E. Geib, Jr.
BY
Harness, Dickey & Pierce
ATTORNEYS.

United States Patent Office 3,500,088
Patented Mar. 10, 1970

3,500,088
MOTOR SYSTEM WITH EDDY-CURRENT COUPLING
Carl E. Geib, Jr., Lima, Ohio, assignor to The Ideal Electric and Manufacturing Company, Mansfield, Ohio
Continuation of application Ser. No. 228,987, Oct. 8, 1962. This application May 11, 1966, Ser. No. 549,403
Int. Cl. H02k 7/10
U.S. Cl. 310—98                        33 Claims

ABSTRACT OF THE DISCLOSURE

An electrical drive system comprising an electric motor having a rotor member and a stator member, a clutch comprising a field member and an inductor member, an output shaft having the motor and clutch members spaced axially therealong, means mounting one of the clutch members on the output shaft for rotation therewith, a sleeve rotatably mounted circumjacent the output shaft, means mounting the other of the clutch members on the sleeve for rotaton therewith, means mounting the rotor member on the sleeve for rotation therewith, and bearing means for the sleeve and the output shaft spaced axially outwardly beyond the mounting means for the rotor and clutch members.

---

This invention relates to electric motor drive systems and to eddy-current coupling devices associated therewith. This application is a continuation of my copending application Ser. No. 228,987, filed Oct. 8, 1962.

This invention relates particularly to a vertical motor eddy-current coupling unit which is specially designed and constructed to facilitate installation, maintenance, and repair. To this end the support bearings for the system shafts are located at the upper and lower shaft extremities beyond the drive motor at one end and beyond the eddy-current coupling at the other end.

In addition, tachometer means, which are conventionally associated with such systems to sense output shaft speed, are mounted at the upper end of the shafting in a separate and separable housing to permt the tachometer to be maintained and repaired without removal or disassociation of any of the other system parts except for the tachometer housing. In previous systems it has often been necessary to mount extra drive belts on the shafting during assembly becaues of the great difficulty of subsequently disassembling apparatus to mount a new drive belt. It is possible with a system designed in accordance with the present invention to readily change tachometer drive belts.

Furthermore, the various components of the system are designed and connected in a new and improved manner facilitating assembly and subsequent disassociation of various parts for changes in operation, maintenance, or repair. The system collector rings and brush assemblies are conveniently mounted either at the top or the bottom of the unit to facilitate maintenance, repair, or replacement.

In the present system, the motor and eddy-current coupling are designed to enable the bearing means for the shafting to be supported in a new and improved manner to reduce the number of bearing components required, to improve thrust absorption characteristics of the system, and to increaese wear and lift of the bearings in use. To this end, the upper bearings are thrust bearings capable of absorbing all thrust loads developed by the unit and also by the load on the output shafting. The lower bearings are, in the preferred embodiment, merely guide bearings.

Another feature of the present invention is the provision of locking means to permit the relatively rotating field and inductor members of the eddy-current coupling to be selectively locked together to effect a direct connection between the drive motor and the load. To this end, special fastening means are provided comprising fastening plugs insertable between salient pole pieces of the field member and fixedly connected to the inductor member to form a rigid connection therebetween. In the preferred embodiment, the fastening plugs take the form of a threaded member adapted to be threadably mounted in radially extending ports in the inductor member and supporting a resilient sleeve in fixed abutting engagement between adjacent pole pieces of the field member.

The invention also includes new and improved means of disconnecting the drive motor from the eddy-current coupling without dislocation of the parts of the system from normal operating positions. To this end, the system is designed so that the motor means may be temporarily removed from the unit while the eddy-current coupling is removed from the system and replaced in the unit in exactly the same position previously held.

A special adaptor means may be provided to connect the motor means directly to the output shafting after the eddy-current coupling has been removed so that the drive motor and the other associated parts of the system will retain their exact previous locations and have the same previous arrangement so as not to adversely affect the relationship between the drive system and the load.

The subject drive system is also provided with new and improved means to adjust the output shafting relative to the load without having to physically change the location of the entire unit.

Another feature of the present invention relates to a new and improved air cooling system. To this end, fan blades, baffles, air inlet ports, and air outlet ports of the cooling system are arranged in a manner facilitating maximum cooling results.

Other features, advantages, and objects of the invention are hereinafter illustrated by a detailed description of the inventive principles with reference to the accompanying drawing wherein:

FIGURE 1 is a side elevational view, partly in section of an illustrative embodiment of the present invention;

FIGURE 2 is a plan view of the apparatus shown in FIG. 1;

FIGURE 3 is partial side elevational view of fastening means which may be associated with the apparatus shown in FIG. 1; and FIGURE 4 is a partial side elevational view, partly in section, of an alternative motor-load coupling.

In general, the subject drive system is adapted for use to drive a load such as a pump (not shown) by means of a connecting shaft and coupling (not shown). The drive system comprises a motor 20 and eddy-current coupling 22 which form a drive unit in a vertical attitude. The inventive principles relate particularly to large heavy duty units capable of producing 50 to 100 k.w. or more. The installation and subsequent servicing of such large units produce problems not found in smaller, less bulky, and more easily handled units.

Referring now to FIGS. 1 and 2, the principles of the present invention are embodied in an illustrative vertical air cooled drive system comprising a series of vertically stacked housings 50, 52, 54, 56, 58. The housings are mounted and fastened to one another in a manner permitting sequential disassociation of the housings from one another or of groups of housings from housings therebelow.

The system comprises centrally located vertical shafting. Output shaft means 60 extend the length of the unit.

from the bottom to the top, and is formed from separable upper and lower portions 62, 64. The abutting ends of the shaft portions 62, 64 are provided with coupling flanges 66, 68 which are adapted to be secured by fastening means 70 in a manner to be hereinafter described in detail. The lower end 72 of the output shaft portion 64 is provided with suitable coupling means 74, such as a key device, for driving connection to the load. If desired the other end 75 of the shafting may be extended for driving connection to another load as shown in phantom.

The shaft portion 64 is rotatably supported by a bearing unit 76 mounted at the extreme lower end of the system casing and readily accessible through an access port 78. The upper end 80 of the output shaft is supported by a thrust bearing unit which is mounted in the bearing housing 52. The thrust bearing unit comprises a sleeve member 86 which is keyed to the shaft portion 62 as indicated at 88 and is secured thereon by a threaded ring and lock nut assembly 90. The sleeve 86 is rotatably supported relative to a support post 91 by a ball bearing unit 92 and a thrust bearing 94 in the form of a spherical roller bearing assembly. The thrust bearing 94 accommodates all down thrusts in the drive system and in the load. Momentarily imparted upwardly directed forces are accommodated by the ball bearing assembly having sufficient clearance as indicated at 96 between the upper surface of the outer race and the retaining ring 98. The entire bearing assembly is spring-loaded as indicated at 100 and mounted within the housing 52 to define a lubricant reservoir 102. A stand pipe 104 is fixed to a bottom plate 106 of the housing and extends upwardly circumjacent the shaft portion 62 within a bore 108 formed in the support sleeve 86 to prevent oil from leaking down the shaft. A port 109 connects the bottom of reservoir 102 to the interior of the bearing assemblies and a port 110 communicates with an oil lift passage 112 adapted to carry oil to the top of the bearing unit 92.

The slip ring and tachometer housing 50 is removably mounted on top of the housing 52 and comprises a cover portion 114 which is suitably secured on a flange 116 of the housing 52 by bolt means 118 or the like. The cover 114 is removable by loosening the bolts 118 to expose the upper end 80 of the shaft portion 62 and tachometer and slip ring assemblies mounted therein. The housing 50 is further provided with an annular bottom plate 120 which has a peripheral machined groove 122 adapted to abuttingly engage the inner end 124 of the flange 116 and to be rigidly secured thereto by bolt means 126. The annular plate 120 is provided with a central aperture 127 in a hub portion 130 surrounding the shaft 62, the sleeve 36, and the lock nut 90.

A tachometer 136 is fixedly secured on a bracket 138 in the housing 50 on the bottom plate 120 with the tachometer shaft 140 extending in a vertical plane. A pulley unit 142 is mounted on the end of the tachometer shaft and is drivingly connected to the end of the shaft portion 62 by a belt 144 and a pulley assembly 146. It may be readily seen that the belt 144 can be easily replaced and repaired by simply removing the cover 114.

A slip ring assembly for the field member of the eddy-current clutch is also mounted in the housing 50 and comprises a support ring 152 fixedly secured to the shaft portion 80 and supporting slip ring elements 154, 156. A contact post 158 is fixedly mounted on the bottom plate 120 and is provided with brush means 160, 162 in electrical engagement with the rings 154, 156. The brushes are suitably electrically connected to a power source in a conventional manner. Leads 166, 168 extend inwardly from the rings 154, 156 through a radially extending slot 170 in the shaft and axially along the shaft in a central bore 172 to a radially extending bore 174 through which the leads 166, 168 extend for connection to the field member of the eddy-current clutch in a manner to be hereinafter described in detail.

It should be noted that the bearing units are readily accessible by removing the cover 114 and by removal of the support plate 120. The cover 114 and the plate 120 are removable upwardly and outwardly to expose the bearings in the housing 52. If desired, the entire bearing housing 52 can be removed by disassociation from the housing 54. The bottom plate 106 of the housing 52 is secured at its periphery by a plurality of bolt means 180 to a support ring 182 fixedly mounted in the upper end of the housing 54. The fastening means 180 preferably take the form of a plurality of adjusting screws circumferentially spaced about the plate 106 to enable equal axial adjustment of the plate 106 relative to the plate 182 and hence of the housings 50, 52 relative to the housing 54, 56, 58. In this manner the output shafting may be axially shifted relative to the housings to variably position the coupling means 74 and compensate for variations in load positions and location relative to the drive unit to the extent permitted by the clearances provided between the various parts of the unit.

A second upper bearing housing 190, forming part of the housing 54, is mounted in axial alignment beneath the housings 50, 52 and provides support therefor. The housing 190 comprises a side wall portion 192 and a bottom plate portion 194. A stand pipe 195 is fixedly mounted in a central aperture 196 in the plate 194 and extends upwardly therefrom to define a lubricant reservoir 198. A bearing support post 200 is centrally formed on the bottom plate 194 and is connected by rib elements 202 to the side wall 192 and plate 194. A thrust bearing assembly 204 is mounted on the support post 200 at one end and on a sleeve element 206 at the other end. The sleeve element is connected by a key 208 or the like to the upper end 210 of a rotatable sleeve 212 which is concentrically rotatably mounted relative to the shaft 62. A locking ring and nut assembly 218 secure the sleeve 206 to the rotatable sleeve 212. A downwardly extending rim 220 is positioned closely adjacent the outer surface of the sleeve to provide a lubricant seal by means of an inwardly facing groove 222 and a lubricant deflector 224 is mounted to the shaft 62 above the end 210 of the sleeve to prevent any lubricant passing through the housing from traveling axially down the shaft 62.

Specially designed air inlet means are associated with the housing 190 and comprise oppositely located arcuate air inlet ports 230, 232 covered by suitable screen or filter means. Radially inwardly extending air inlet passages are defined by side plates 234, 235, FIG. 2, which take the form of somewhat U-shaped members in plan view, each having a central base portion 236 and radially extending wing portions 238, 240 which extend outwardly at an acute angle from the base portion to the arcuately extending inlet ports 230, 232. The base portions 236 are fixedly secured to and form part of the side walls of the housing 190.

The entire assembly is removably supported on the motor housing 56 by means of oppositely located arcuate ring members 242 which have a machined groove 244 adapted to overlie a similarly contoured end plate 246 of the motor casing. Bolt means 248 or the like are provided to secure the arcuate plates 242 on the end plate 246. Support ring portions 250, 252 may be provided for supporting the screen or filter means 232. Cover plates 254, 255 are provided on opposite sides of the bearing housing 190 between the radially extending flanges 238, 240 and are suitably secured to the side wall 192. The motor casing is enclosed by additional cover plates 257, 258 which may be provided with suitable access means 259, as shown in FIG. 2.

As may be noted, the bearing housing 190 is readily accessible by removal of the plate 106 and the fastening devices 180. In addition, the fastening means 248 are accessible by removal of the filter screen 232 to permit the entire housing to be removed when it is desired to gain access to the interior of the motor housing. The air inlet chambers, which provide an orifice effect of air flow from the atmosphere to the interior of the electric motor and eddy-current clutch for cooling purposes, are connected by suitable axially extending inlet ports 260 defined by an annular baffle 262 having a tapered approach surface 264 and an annular rim surface 266. The lower end of the baffle terminates closely adjacent and, in the preferred embodiment, in slight overlapping relationship relative to a plurality of circumferentially spaced fan blades 268 which are fixedly secured to the motor rotor by suitable fastening means.

The motor includes a salient pole rotor 269 having a support hub which is substantially T-shaped in cross section. A plurality of central air ports 274 are circumferentially spaced in a flange portion 272 of the hub which is secured by bolt means 278 between spaced flanges 280, 282 of separable portions 284, 286 of the rotatable sleeve 212. The hub is provided with a flat annular support rim portion 288 on which salient pole pieces 290 and coil elements 292 are secured by suitable fastening means 294. The coil 292 is adapted to be electrically energized by leads 296, 298 which are connected to a power source through slip rings 300, 302 mounted on a bracket 304 secured to an end ring 305 carried by the rim portion 288. Brush members 306, 308 are mounted on a bracket element 310 suitably secured to the plate 194 and connected to the power source in a conventional manner.

The motor further comprises stator means fixedly secured to the side wall 320 of the housing 56 by means of spaced annular rims 322, 324. Laminations 326 are stacked on support rods between the inner faces of the rims 322, 324 and coils 330 are associated with the laminations in a conventional manner and supported on brackets 332, 334 by support rings 336, 337. The coils 330 are connected in a conventional manner by leads to a source of energy as shown at 338. The laminations 326 are provided with a plurality of radially extending cooling passages 344 and are radially spaced from the ends of the salient poles 290 to define an air gap 346.

The annular rim 324 is mounted on a support ring 350 forming part of the eddy-current clutch housing 58 and forms a dividing wall between the drive motor housing 56 and the eddy-current clutch housing 58. The rim 324 may have a groove 352 machined to receive the ring 350 and conventional fastening means 354 are provided to secure the plate 324 on the ring 350. The fastening means 354 are preferably accessible from outside of the casing of the unit as shown.

The drive motor is air cooled by air flowing from the inlet ports 230, 232 due to the action of the fan blades 268 which direct air across the salient pole rotor and radially outwardly through the air passages 344 in the stator laminations. The air is dispensed outwardly through the side wall of the casing through suitably located outlet ports 358 which are circumferentially spaced about the rim of the casing. In addition, the upper ends of the coils 330 are cooled by air flowing outwardly into a chamber 360 defined by the ring 246, the side wall 320, the rim 322 and the funnel baffle 262. A plurality of outlet ports 362 are spaced around the periphery of the chamber 360 in the side wall. An electrical conduit box 364 may be suitably mounted on the side of the motor casing by a bracket 368 and connected to a power source by a lead-in cable 369. It is to be noted that the motor assembly and motor housing 56 are separably mounted on top of the eddy-current clutch housing 58 in a convenient and accessible manner.

The eddy-current clutch includes a field member 374 comprising a support hub having a substantially T-shaped cross section. A radially extending flange portion 376 is connected between the spaced flanges 66, 68 by the fastening means 70. A plurality of central air ports 378 are circumferentially spaced about the flange 376. A flat annular salient pole support portion 379 supports circumferentially spaced salient pole pieces 380 and associated coils 382 by means of suitable fastening members 384.

The lead wires 166, 168 are fastened by suitable bracket means 386 along the shaft portion 62, the flange 376, the rim 379, and are connected to the coils 382 in a conventional manner.

The inductor member of the clutch comprises spaced radially extending end arm portions 390, 392 which are connected by an annular inductor member 394 at their outer ends. The inductor member 394 has a smooth annular inner surface spaced closely adjacent the salient pole pieces to define an air gap 398. Air vent means are provided in the inductor and, in the illustrative embodiment, take the form of a plurality of centrally located, circumferentially spaced ports 399. The arm 390 is fixedly connected to the sleeve element 286 and is rotatably supported by the bearing means 204. The radial arm 392 is fixedly secured to a sleeve element 402 by suitable fastening means 404.

The sleeve 402 is rotatably supported by a guide bearing assembly 406 comprising cylindrical roller bearings 408 mounted on an inner race 410 connected to sleeve 402 and an outer race 412 mounted on a compensation sleeve 413. Bracket 414 supportingly cooperates with the sleeves 413 and is fixedly secured to a support ring 415 by an annulus 416 and suitable fastening means. The ring 415 is fixedly supported by a plurality of circumferentially spaced radially extending ribs 420 which are secured at their outer ends to a bottom plate 422 and to the side wall 370 at 424. The guide bearing assembly 76 includes an inner race 434 associated with the shaft 64, roller bearing elements 436, and an outer race 438 mounted on a compensation sleeve 439 associated with a bracket 430 connected to the ring 415 by an annulus 432 and suitable fastening means. Each of the roller bearing assemblies are fully split roller bearing assemblies to facilitate assembly and disassembly operations and are easily accessible from the bottom of the unit. The roller bearing assemblies are also self-aligning as provided by spherical seats on the compensation means 412, 414, 430, 439. Suitable lubricant conduits 440, 442 may be provided to keep the bearing assemblies lubricated.

The cooling system for the eddy-current clutch mechanism includes a shroud element 450 divided into upper and lower halves by a circumferential central air passage slot 456. The shroud is fixedly mounted on a plurality of radially extending circumferentially spaced blades 458 which extend axially from side to side of the inductor rim 394. The ends of the shroud extend axially beyond the end rings 390, 392, as indicated at 460, 462, and have radially inwardly directed rim portions 464, 468 which terminate at radially inwardly located points beyond a plurality of circumferentially spaced air inlet ports 470, 472 provided in the end rings adjacent the salient poles 380 and the coils 382. The shroud defines axially extending air passages in conjunction with the fan blades 458 extending from the ends of the inductor member inwardly to the central air port 456. The air inlets 470, 472 provide for the passage of air inwardly over the salient poles and coils and outwardly through the central air ports 399 provided in the inductor rim 394 directly opposite the outlet port 456.

Combination fan blades and stiffeners 480 are provided on the end ring 390 and are suitably secured to the sleeve 286 at one end and to the shroud 450 at the other end. The combination fans and stiffeners take the form of radially extending ribs spaced circumferentially about the end ring 390. In addition, a plurality of circumferentially spaced fan blades 482 are mounted on the lower side of the salient pole rotor of the motor to direct air radially outwardly over the lower ends of the motor stator coils 330. The end of the rim portion 464 of the shroud is transversely bent to form an axially extending annular rim 484 terminating closely adjacent the fan blades 482 to direct the air into the inlet passages 470 and the inlet passages 488 defined by the fans 480 and the shroud 450. The fans 480 pull air into the passages 488 and the ports 470 from the air inlet with some of the air passing through the ports 274 in the motor rotor and some passing over the motor rotor poles. The shroud portions 464, 484 define an annular chamber 490 in conjunction with the side wall 370 and the plate 324. Air is directed into the chamber 390 and over the lower end of the coil 330 of the motor stator and outwardly through a plurality of exhaust ports 492.

Axially spaced radially inwardly extending rim portions 500, 502 are fixedly secured at one end to the side wall 370 of the housing and extend radially inwardly for cooperation with radially outwardly extending flanges 504, 506 provided at the ends of the shroud and adapted to maintain a running fit with the ends of the rims 500, 502. In this manner, cooling air is directed to outlet passages 510 provided radially oppositely the ports 399 and 456 to exhaust air radially outwardly through the sides of the eddy-current clutch housing. The exhaust ports 358, 362, 492, 510 are located in a particular manner relative to the inlet ports 230, 323 to promote maximum cooling. Thus, in the preferred embodiment, the outlet ports are located opposite one another, substantially 180° apart. Each set of outlet ports are divided into oppositely located groups of ports extending along opposite arcuate segments of the housings for a distance between approximately 70 to 90°. The outlet ports are spaced arcuately from the inlet ports so that there is no overlap or a minimum of overlap of the inlet ports and outlet ports as shown by the line 512. Thus, the centers of the inlet ports are located approximately 90° from the centers of the outlet ports so that the warm exhaust air is not directed upwardly into the inlet ports. In addition to the upper inlet ports a series of air inlet ports 520 are provided at the lowermost extremity of the eddy-current clutch housing around the entire periphery to establish an air flow radially inwardly and upwardly into the inlet ports 472 and 522 at the lower end of the eddy-current clutch apparatus.

A plurality of fan blades 520 are formed at the lower end of the inductor by radially inwardly extending portions of the blades 458. The blades and the shroud portion 468 define an air inlet chamber 522 adjacent the inlet ports 472, 522. Air is drawn through the inlet ports 520 by the fan blades and discharged at an intermediate point between the ends of the unit through the ports 510. Thus, in the present cooling system, air is drawn from both ends of the unit and radially outwardly discharged at intermediate points. Each portion of the apparatus requiring maximum cooling is provided with a separate air flow path, flow inducing means, and annular outlet chambers axially spaced along the length of the unit.

In order to provide suitable support for the apparatus and release the load on the bearings during shipment of the apparatus, storage, or at other desirable times, a plurality of jack screws 530 are threadably mounted in a fixed portion of the frame 534 and are extendable upwardly through access ports 536 provided in the end ring 392 for engagement at 538 with the field member 374 of the eddy-current clutch. In this manner the weight of the field member may be taken off of the shaft means.

In some instances it is necessary or desirable to directly drive the load by means of the motor without use of the eddy-current clutch drive. To this end, as shown in FIG. 3, fastening means may be provided to lock the field member 374 of the eddy-current clutch to the inductor member 450 to prevent relative rotation therebetween and to obtain a direct driving relationship between the motor and the load. To this end, the air outlet ports 399 in the inductor rim 394 are threaded to receive plug means 560 having a radially inwardly extending stub shaft 562 on which a resilient coupling device 564 is mounted. The coupling device may be made of rubber or the like and have a slight taper to facilitate insertion between adjacent edges 566, 568 of adjacent salient poles 570, 572. The compressibility of the coupling device and its tapered lead surface accommodates slight misalignment between the field member and the inductor member as the plug means are threaded into place. A plurality of circumferentially spaced plugs may be mounted by insertion through the exhaust ports 456 and 510 and by threaded association with the ports 399. A drive slot 574 may be provided to receive a suitable tool. The diameters and dimensions of the air ports in the coupling device may be varied, as desired or necessary to permit installation. When the coupling device is in place in frictional abutting engagement between the adjacent poles, the field, member is directly connected to the inductor member to prevent relative rotation therebetween. Alternatively, the clutch may be locked by means of pins or keys removably associated with the sleeve 286 and the shaft 60 at some convenient place whereat an access port may be provided to enable a locking tool to be inserted.

Another method of directly coupling the drive motor to the load is by loosening the fastening means 354 and temporarily removing interior portions of the unit from the main support housing 58. At such time, the sleeve portion 286 is detached from association with the salient pole rotor 269 by removal of the fastening bolts 278, and the inductor assembly and the field assembly of the clutch are similarly removed. The upper shaft portion 62 with flange 66 is also removed. Then, as shown in FIG. 4, an auxiliary coupling shaft 550, having a flange portion 552 corresponding to the flange 282 of the eddy-current clutch sleeve 286 and a flange portion 554 corresponding to the flange 66 on the lower portion of the shaft 62, is directly connected to the flange portion 280 and to the flange portion 68 to provide a direct coupling between the motor and the load. The unit is replaced on top of the eddy-current clutch housing in exactly the same position it held previously when the eddy-current coupling apparatus was utilized. Therefore, the drive mechanism may be reassembled in exact alignment as previously located without having to compensate or adjust for variations in position relative to the load after the change to the auxiliary coupling shaft.

The arrangement of the output shafting also permits a wide range of operational variation. For example, in deep well pumping operations, non-reverse ratchet means are often associated with the output shaft. With the present apparatus, the output shaft may be made hollow to accommodate an extension of the pump drive shaft to a position above the upper housing 50. The ratchet mechanisms can then be mounted at the top of the unit for easy access.

Another advantage of being able to extend the output shaft through the top of the unit is the ability to provide axial shaft adjustment means at the upper end of the output shaft in a convenient and accessible position.

Since the inventive principles hereinbefore disclosed are capable of utilization in various ways in a variety of embodiments with changes in the details of construction and the arrangement of the parts, it is intended that the scope of the appended claims be construed to include all those variations and modifications which encompass the inventive principles except insofar as limited by the prior art.

What is claimed is:

1. In an electrical drive system comprising an electric motor and a coupling device, an output shaft means adapted to be driven by said motor through said coupling device, cooling means mounted on said motor and said coupling device and movable thereby to induce a flow of cooling air axially along said output shaft means from inlet means adjacent the ends of said system axially along and over said electric motor and said coupling device to intermediate outlet means, and bearing means comprising the sole means for rotatably supportnig said shaft and being spaced axially outwardly beyond said motor and said coupling device to provide for access to said bearing means without requiring disassembly of said motor from said coupling device.

2. The invention as defined in claim 1 and wherein said outlet means are circumferentially located at points spaced circumferentially from said inlet means to discharge heated air from said outlet means to the atmosphere at points circumferentially spaced from said inlet means to maintain substantially atmospheric air temperature of air flowing into said inlet ports.

3. In an electrical drive system comprising an electric motor, a clutch means, output shaft means normally drivingly connected to said electric motor through said clutch means, locking means including means for limiting rotation of relatively rotatable portions of said clutch means to directly connect said electric motor to said output shaft through said clutch means by mechanically locking said clutch means relative to said electric motor and said output shaft means, and bearing means for said sleeve and said output shaft spaced axially outwardly beyond the mounting means for said rotor and clutch members, said bearing means comprising the sole means for operatively supporting said sleeve and said shaft, whereby to provide access to said bearing means without requiring disassembly of said motor from said clutch.

4. In an electrical drive system comprising an electric motor, an eddy-current clutch device, output shaft means normally clutchably drivingly connected to said motor through said clutch device, said clutch device comprising a field member having a plurality of circumferentially spaced salient poles and an inductor member normally rotatable relative thereto, fastening means to fixedly secure said inductor member relative to said field member and directly couple said motor to said output shaft means, and bearing means for said sleeve and said output shaft spaced axially outwardly beyond the mounting means for said rotor and clutch members, said bearing means comprising the sole means for operatively supporting said sleeve and said shaft, whereby to provide access to said bearing means without requiring disassembly of said motor from said clutch.

5. In an electrical drive system comprising an electric motor, an eddy-current clutch device, output shaft means normally clutchably drivingly connected to said motor through said clutch device, said clutch device comprising a field member having a plurality of circumferentially spaced saliant poles and an inductor member normally rotatable relative thereto, and fastening means to fixedly secure said inductor member relative to said field member and directly couple said motor to said output shaft means, said inductor member being provided with a plurality of air ventilating ports normally forming part of the cooling system, and plug means adapted to be fixedly mounted in said ports and extending into abutting engagement with said field member to prevent relative rotation between said inductor member and said field member.

6. The invention as defined in claim 5 and wherein said plug means comprises a cylindrical portion having threads formed therein, and said ports being similarly threaded to receive said plug means.

7. The invention as defined in claim 6 and wherein resilient abutment means are mounted on said plug means to extend in between adjacent saliant poles in abutting retaining engagement therebetween.

8. In an electrical drive unit comprising an electric motor, an eddy-current coupling, output shaft means drivingly connected to said motor through said coupling, means mounting said system in a vertical attitude with the central axis of said shaft means extending vertically and said motor and said coupling mounted circumjacent thereto; an air cooling system comprising an air inlet housing mounted at the top of said unit, a pair of oppositely located radially outwardly opening air inlets, radially inwardly converging passage means extending radially inwardly from said air inlets, transverse axially opening ports connecting said passage means to the interior of said unit, and fan means provided in said unit to draw air into said unit through said air inlets, passage means, and ports for cooling of said motor and said coupling.

9. The invention as defined in claim 8 and wherein funnel means extend from said ports to a position located closely adjacent at least a portion of said fan means to establish a direct flow of air from said air inlet to said fan means along a path which is first radially inwardly directed and subsequently transversely axially directed.

10. In an electrical drive unit comprising an electric motor and an eddy-current coupling, output shaft means drivingly connected to said motor through said coupling, housing means enclosing said unit, an air cooling system comprising air inlet means disposed at the ends of said unit, air outlet means provided in the side walls of said housing intermediate said motor and said coupling, fan means attached to said motor and rotatable therewith to establish a flow of cooling air over said motor, fan means attached to said coupling and rotatable therewith to establish a flow of cooling air over said coupling, air flow controlling means including means defining axial and radial air flow passages associated with said motor and said coupling to direct the cooling air axially from said inlet ports to the motor and to the coupling and then radially outwardly through said outlet ports, and bearing means for said sleeve and said output shaft spaced axially outwardly beyond the mounting means for said rotor and clutch members, said bearing means comprising the sole means for operatively supporting said sleeve and said shaft, whereby to provide access to said bearing means without requiring disassembly of said motor from said clutch.

11. The invention as defined in claim 10 and wherein a shroud is mounted circumjacent said coupling, and the ends of said shroud extending axially beyond said coupling and radially inwardly closely adjacent said fan mans to define air flow passages around said coupling to said outlet ports.

12. In an electrical drive unit comprising: a motor having a rotor and stator; an eddy-current coupling having a pair of relative rotatable members; an output shaft means, separable mounting means drivingly connecting said output shaft means to one of said relatively rotatable members, separable mounting means drivingly connecting said rotor to the other of said relatively rotatable members, and an auxiliary shaft means directly connectible between said output shaft means and said rotor by connection to said separable mounting means after disconnection of said output shaft means and said one of said relatively rotatable members and disconnection of said rotor and the other of said relatively rotatable members.

13. The apparatus as defined in claim 12 and wherein said separable mounting means comprises radially extending flanges and associated fastening means, said auxiliary shaft means having corresponding radially extending flanges adapted to be drivingly connected at one end to a radial extending flange driven by said rotor and at the other end to a radially extending flange connected to said output shaft means.

14. In a vertical mounted electrical drive system comprising a main support housing means for said system, motor means, an eddy-current coupling, output shaft means connected to said motor means by said coupling for driving a load, bearing means for operatively supporting said shaft means, said bearing means being spaced axially outwardly beyond said motor means and said coupling and comprising the sole means for supporting said shaft means, whereby to provide for access to said bearing means without requiring disassembly of said motor means from said coupling, and means to axially shift said output shaft means relative to said load without movement of said main support housing means.

15. The apparatus as defined in claim 14 and having bearing means for said output shaft means, bearing housing means movably mounted on the top of said main support housing and fixedly supporting said bearing means, and means to shift said bearing housing means relative to said main housing means and axially shift said output shaft means relative to said load.

16. A cooling system for an electric motor and clutch assembly having an output shaft, said motor having a rotor member and a stator member, said clutch having a field member and an inductor member, means mounting one of said clutch members on said output shaft for rotation therewith, a sleeve rotatably mounted circumjacent said output shaft, means mounting the other of said clutch members on said sleeve for rotation therewith, means mounting said rotor member on said sleeve for rotation therewith, bearing means for said sleeve and said output shaft spaced axially outwardly beyond the mounting means for said rotor and clutch members, an annular casing for said motor, means supporting said stator relative to said casing in a radially inwardly spaced relationship, coil means associated with said stator and extending axially outwardly therefrom, air inlet means, air outlet means, flow path defining means to direct cooling air from said air inlet means to said air outlet means along separate paths over at least the central portion of said stator and each of the end portions of said coil means extending axially outwardly beyond the stator, and fan means to induce flow of air along said separate paths.

17. The invention as defined in claim 16 and wherein each of said separate paths include an annular air outlet chamber.

18. The invention as defined in claim 17 and wherein said stator means forms one wall of the annular air outlet chamber associated therewith, and air passage means formed in said stator and extending radially outwardly to connect said air inlet means to said air outlet means.

19. A cooling system for an electrical drive unit formed by a motor and an eddy-current coupling and comprising housing means surrounding said motor and said eddy-current coupling; said motor comprising a salient pole rotor member having salient pole pieces and coils, and a stator member having laminations and coils; axially spaced radially extending annular rim means attached to said housing means and defining an air outlet chamber therebetween; said laminations being mounted between and supported by said annular rim means; a plurality of radially extending cooling passages extending through said laminations and communicating with said air outlet chamber; outlet openings in said housing means communicating with said air outlet chamber to permit cooling air to flow from said air inlet chambers through the interior of said housing means and said cooling passages in said laminations and said air outlet chamber and out of said housing means; said coils of said stator member being located axially beyond said annular rim means; annular air outlet chambers formed between said coils and said housing means; outlet ports in said housing means communicating with said annular air outlet chambers to permit cooling air to flow from said air inlet chambers through the interior of said housing means and over said coils and through said cooling chambers and out of said outlet ports; and fan means mounted on said rotor member in general axial alignment with said coils and said chambers to direct cooling air over said coils to said cooling chambers.

20. The invention as defined in claim 19 and said eddy-current coupling comprising a rotatable field member having salient pole pieces and coils, a rotatable inductor member mounted circumjacent said field member in closely spaced relationship relative thereto defining an axially extending air gap therebetween and having end portions extending axially beyond said field member; spaced radially extending end supports connected to said end portions of said inductor member and extending radially inwardly in closely spaced relationship adjacent said field member;

axially spaced radially extending annular rim elements attached to said housing means and defining an air outlet chamber therebetween;

a shroud element extending between said annular rim elements and being mounted circumjacent and in closely spaced relationship to said inductor member;

air passage means in said shroud element communicating with said air outlet chamber between said annular rim elements;

air passage means in said inductor member communicating with said air outlet chamber between said annular rim elements through said air passage means in said shroud element;

first air flow passage means extending through said end supports and over said coils and between said salient pole pieces and said inductor member to said air passage means in said inductor member to permit flow of cooling air from said air inlet chambers through the interior of said housing means to said air outlet chamber along said first air flow passage means;

second air flow passage means extending around said end supports and along said inductor member between said inductor member and said shroud element to said air outlet chamber to permit flow of cooling air from said air inlet chambers through the interior of said housing means to said air outlet chamber along said second air flow passage means;

and fan means mounted on and being rotatable with said inductor member to direct air along said first air flow passage means and said second air flow passage means.

21. An electrical drive system comprising an electric motor having a rotor member and a stator member, a clutch comprising a field member and an inductor member, an output shaft having said motor and clutch members spaced axially therealong, means mounting one of said clutch members on said output shaft for rotation therewith, a sleeve rotatably mounted circumjacent said output shaft, means mounting the other of said clutch members on said sleeve for rotation therewith, means mounting said rotor member on said sleeve for rotation therewith, and bearing means for said sleeve and said output shaft spaced axially outwardly beyond the mounting means for said rotor and clutch members, said bearing means comprising the sole means for operatively supporting said sleeve and said shaft, whereby to provide access to said bearing means without requiring disassembly of said motor from said clutch.

22. The invention as defined in claim 21 and wherein said bearing means comprising a first pair of bearings rotatably supporting said output shaft means and being located at axial opposite ends of said output shaft means beyond each of said motor rotor member, said motor stator member, said clutch means field member, and said clutch means inductor member, and said bearing means further comprising a second pair of bearings rotatably supporting said sleeve member and being located at axial opposite ends of said sleeve member beyond each of said motor rotor member, said motor stator member, said clutch means field member, and said clutch means inductor member, there being no additional bearing means located axially between said first pair of bearings and said second pair of bearings.

23. An electrical drive system as set forth in claim 21 wherein said motor and said clutch are disposed in vertical alignment.

24. An electrical drive system as set forth in claim 23 wherein said motor is disposed above said clutch.

25. An electrical drive system as set forth in claim 21 wherein said bearing means comprises first and second pairs of bearing assemblies spaced axially outwardly beyond said mounting means for said rotor and clutch members.

26. An electrical drive system as set forth in claim 25 wherein each of said pairs of bearing assemblies comprises a thrust bearing for rotatably supporting said sleeve and a radial bearing for rotatably supporting said shaft.

27. An electrical drive system as set forth in claim 23 which includes a series of stacked housings separable and vertically removable from one another to provide for convenient access to said bearing means.

28. An electrical drive system as set forth in claim 27 which includes means disposed in one of said removable housings for transmitting electrical current to said clutch.

29. An electrical drive system as set forth in claim 28 wherein said means for transmitting electrical current to said clutch is disposed axially beyond said mounting means for said rotor and said clutch members to provide for access thereto without disassociation of said motor from said clutch.

30. An electrical drive system as set forth in claim 27 which includes sensing means for determining the rotational speed of said output shaft, said sensing means being located axially outwardly beyond said mounting means for said rotor and clutch members to provide for convenient access thereto without disassociation of said motor from said clutch.

31. An electrical drive system as set forth in claim 21 which includes cooling means for inducing a flow of cooling air axially of said output shaft from inlet means located adjacent the ends of the system to outlet means located intermediate said motor and said clutch.

32. An electrical drive system as set forth in claim 21 which includes locking means for directly connecting said motor to said output shaft through said clutch by mechanically locking said field and inductor members.

33. An electrical drive system as set forth in claim 21 which includes auxiliary shaft means directly connecting said output shaft with said sleeve.

References Cited

UNITED STATES PATENTS

| 2,733,660 | 2/1956 | Towle et al. | 310—94 X |
| 2,280,736 | 4/1942 | Winther | 310—98 X |
| 2,286,777 | 6/1942 | Winther | 310—95 |
| 2,372,633 | 3/1945 | Angold | 310—98 |
| 2,513,802 | 7/1950 | Jones. | |
| 2,925,923 | 2/1960 | Preston. | |
| 3,020,427 | 2/1962 | Wheeler | 310—59 |
| 3,064,152 | 11/1962 | De Paul | 310—254 |
| 3,209,184 | 9/1965 | Woodward | 310—103 |

FOREIGN PATENTS

| 107,049 | 6/1917 | Great Britain. |
| 709,946 | 6/1954 | Great Britain. |
| 1,129,956 | 9/1956 | France. |
| 1,184,988 | 2/1959 | France. |
| 1,082,977 | 6/1960 | Germany. |
| 548,649 | 9/1956 | Italy. |

DAVID X. SLINEY, Primary Examiner

U.S. Cl. X.R.

310—89, 100, 105, 112